UNITED STATES PATENT OFFICE.

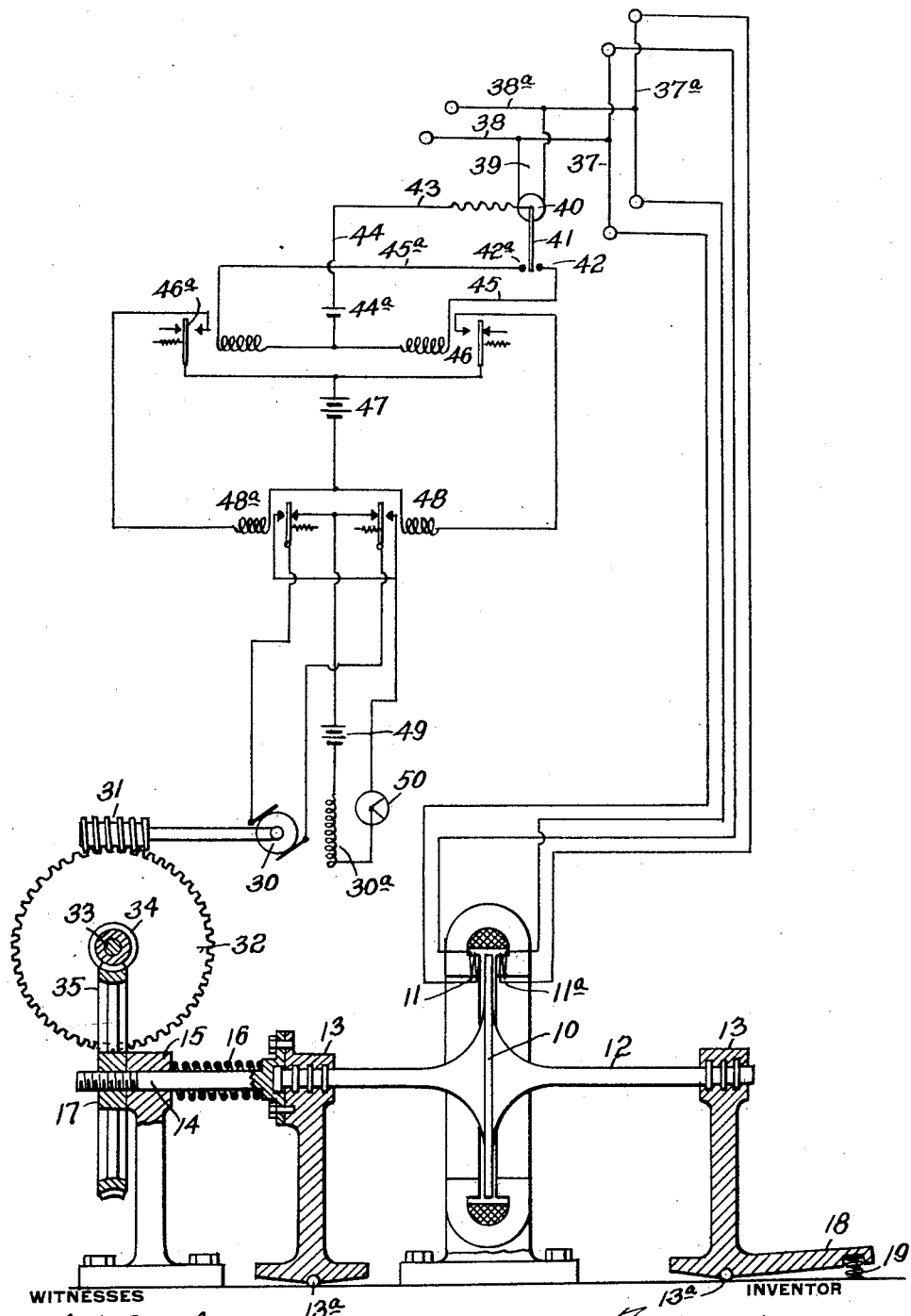

FRED H. KROGER, OF BROOKLYN, NEW YORK, ASSIGNOR, BY MESNE ASSIGNMENTS, TO WESTINGHOUSE ELECTRIC & MANUFACTURING COMPANY, A CORPORATION OF PENNSYLVANIA.

CONTROL OF ELECTRIC MACHINES.

1,403,172.   Specification of Letters Patent.   Patented Jan. 10, 1922.

Application filed July 3, 1916. Serial No. 107,338.

*To all whom it may concern:*

Be it known that I, FRED H. KROGER, a resident of Brooklyn, in the county of Queens and State of New York, have invented a new and useful Improvement in Controls of Electric Machines, of which the following is a specification.

This invention relates to the control of electric machines, and more particularly to means for controlling or regulating the air gap of high frequency alternators of the type in which a disc armature, rotor or inductor is located between opposed stationary armatures or armature members, in which type of machine it is essential, for efficient operation, that the air gaps be small.

In this type of electric machine the rotor has a tendency to move bodily toward one or the other of the two opposing poles of the stator between which it rotates, and this tendency is aggravated by the magnetic pull exerted upon the rotor toward the near side, which tends to move the rotor still farther from mid position between the opposing poles of the stator and produces a condition of unstable equilibrium. This difficulty has required wider air gaps for machines of this kind than otherwise would have been necessary and this has reduced their efficiency.

The object of this invention is to maintain the rotor in the desired position relative to the stator members, which position in the embodiment illustrated is substantially or exactly midway between the opposing poles of the stator by means which correct the tendency of the rotor to drift from the midway position, immediately upon its starting and before it has appreciably departed from the mid position. The invention is particularly applicable to high frequency alternators of the revolving inductor type, such as the well known Alexanderson high frequency alternator illustrated and described in U. S. Patents No. 1,008,577, November 14, 1911 and No. 1,110,029, September 8, 1914, although it is not limited to this particular form of machine, but is applicable to other electric machines involving rotary and stationary parts.

In the Alexanderson type of alternator the voltage developed in either of the two stationary armatures or stator members is dependent upon the width of the air gap, increasing as the air gap diminishes, and vice versa, so that the change in the width of the air gaps due to the rotor moving out of mid position is manifest by an increase in voltage on one side and a corresponding decrease in voltage on the other side. In the present invention this variation in voltage is utilized to operate relays for setting into operation a suitable force for returning the rotor to mid or desired position and thereby substantially equalizing the voltages in the two armatures or stator members.

The drawing, which represents one embodiment of the invention, shows a longitudinal section through one form of dynamo to which the invention may be applied, with suitable power mechanism, shown diagrammatically, connected thereto for moving the rotor to maintain it in mid position, and a diagrammatic arrangement of circuits for initiating the operaton of the power correcting mechanism.

In the drawing 10 indicates the rotor or inductor of the dynamo, turning between the opposing poles of two armature or stator members 11, 11ª, said rotor being provided with the shaft 12 mounted in the two thrust bearings 13 which serve also as limiting bearings and are utilized to restore the rotor to central position by power applied endwise of the shaft. Both of these bearings are mounted on knife-edge bearings 13ª and are capable of a slight rocking movement on such knife-edge bearings. Rigidly attached to one of the bearings 13 is a screw threaded rod 14 which projects through a rigid support 15 and is surrounded by a spring 16 between said bearing 15 and bearing 13 and serving to take up lost motion. The outer end of the rod 14 is threaded and is engaged by a rotating nut 17 adapted to contact with the side face of the rigid bearing 15, and which nut is rotated in either direction to either push upon or pull upon the rod 14, and thereby rock the bearings 13 either to the right or left, and in that way move the rotor 10 either toward the right or left. The right-hand bearing 13 is held by a constant pressure toward the left, such as by a lever 18 and spring 19.

The nut 17 is arranged to be operated from a motor whose armature is indicated at 30, by any suitable mechanism, that shown comprising a screw or worm 31 on the shaft of the motor and meshing with worm gear 32 on a shaft 33 which in turn is connected by worm 34 to worm wheel 35 which carries the nut 17. When the motor 30 rotates in either direction the threaded rod 14 is moved in one direction or the other, and, in conjunction with the spring 19, corrects any variation of the rotor 10 from its mid position between the opposing armature members 11, 11ª.

One suitable arrangement of circuits and devices for producing the proper operation of the motor 30 to correct the tendency of the rotor to depart from central position, is shown in the drawing. It comprises two hot wires 37 and 37ª, one of which is placed in circuit with the winding of each armature member, or a part thereof, either directly as shown, or through some transformer or other inductive or capacity connection, the essential point being to have each of these hot wires indicate the generating condition of each of the armature windings, independently of the load current on the alternator, and to have the current passing through said wires in direct proportion to the voltage generated in each of the armature windings.

To multiply or amplify the motion of the hot wires, as they deflect on heating, there is attached to the middle or some convenient point on each wire, another wire or thread 38, 38ª which is attached by its other end to a rigid insulated support. Attached to some point near the middle of these second wires is an insulating thread or band 39, a loop of which passes around a small pulley 40. Several turns of the thread may be passed around the pulley or it may be otherwise arranged so as to produce sufficient friction between the thread or band and pulley so that if one hot wire is heated more than the other (and consequently elongates more) the corresponding end of the thread 39 will drop and cause the pulley to rotate about its axis and cause a metallic pointer 41 carried by the pulley to deflect and make contact with one or the other of two contacts 42, 42ª, located one on either side of the pointer. The electric circuit is closed through the pointer by a flexible connection 43 from the center of the pulley to a lead wire 44. With this arrangement any movement of the rotor 10 toward one or the other of the stator members, 11ª decreases the air gap on one side and increases the voltage in the winding of that stator member, as a result of which the corresponding hot wire is heated to produce motion of the pointer 41 and allow current to flow from the lead wire 44 to one or the other of the wires 45, 45ª. This current is utilized for controlling or effecting operation of the power mechanism to restore the rotor 10 to central position before it has materially departed therefrom.

In the arrangement illustrated in the drawings, the pulley 40 is supported by means of the thread 39 and hangs downward, being acted upon solely by gravitational forces. It is to be understood, however, that this particular arrangement is not essential and that the several wires and thread may all be horizontal and that spring forces may be utilized instead of gravitational forces, if for other reasons such an arrangement is advantageous.

The circuit arrangement illustrated for effecting operation of the control motor by current from the contact pointer 41 comprises the two wires 45, 45ª which are in circuit with battery 44ª and with the coils of the relays 46 and 46ª, one or the other of which is actuated each time the pointer 41 closes the circuit through the contacts 42, 42ª. The armatures of relays 46 and 46ª are in circuit with a battery 47 and with the coils of other relays 48, 48ª, the armature of the latter being in circuit with the battery 49, the armature of motor 30, and the field coils 30ª thereof. Said circuit may also include a safety cut-out 50 which preferably will be a contactor mechanically connected to the motor shaft and serving to open the motor circuit and stop the motor before the rotor is moved so far as to strike against either stator member.

The arrangement of the circuits from the relays 48 and 48ª to the motor is such that when relay 48 is closed the motor rotates in one direction, while when relay 48ª is closed said motor rotates in the other direction, as will be readily understood.

In considering the operation of the system let it be assumed that the rotating inductor 10 is displaced so as to reduce the air gap between it and the left hand armature 11. Such displacement will increase the voltage generated in the left hand armature and decrease the voltage in the right hand armature. This change in voltage produces changes in the current flowing through the hot wires 37, 37ª of the control apparatus, the current through the left hand hot wire 37 increasing while the current in the right hand hot wire 37ª decreases. This change in current causes the pointer 41 to close the circuit through the right hand contact 42 and operate relay 46, which in turn operates relay 48 and closes a circuit including the battery 49, the field 30ª of the series motor and the armature 30 of said motor. This drives said motor in such direction as to cause the screw rod 14 to move inwardly and push the rotor 10 toward the right, that is toward its central position between the opposing stator members 11, 11ª. Should the rotating inductor 10 move to reduce the right hand air gap, the motor 30 is caused to rotate in the reverse direction, as will be readily understood by tracing the circuits, and in that case the screw rod 14 moves outwardly and permits the spring 19 to move the rotor back to central position.

It will be understood that the drawings are merely illustrative for the purpose of indicating one method of applying the invention, but that said invention is not limited to the particular apparatus or circuits shown, as many other changes substitutions of various forms of relays will suggest themselves to those skilled in the art.

The number of relays is immaterial, depending largely upon the strength of the currents employed, and it may be found advantageous to utilize other mechanism than an electric motor for applying the proper force to the thrust bearings in order to return the rotor to the mid or desired position. All such modifications will be apparent to those skilled in the art and are to be understood as included within the scope of the claims appended hereto. The differential thermal-relay, including the pointer 41 serves as an indicator of the relative voltages of the two stator members, and therefore indicates the position of the rotor relative to the stator members, and would enable the engineer in charge to adjust the rotor position manually in the event that the power mechanism is incapacitated or unavailable.

What I claim is:—

1. In combination, an electric machine embodying a rotor turning between two opposing stator members, power means for moving the rotor toward either of the stator members, and means whereby movement of the rotor from the desired position between the stator members controls said power means to produce movement of the rotor to re-establish it in the desired position between the stator members.

2. In combination, an electric machine embodying a rotor turning between two opposing stator members, power means for moving the rotor toward either of the stator members, and current controlled means whereby movement of the rotor from the desired position between the stator members controls said power means to produce movement of the rotor to re-establish it in the desired position between the stator members.

3. In combination, an electric machine embodying a rotor turning between two opposing stator members, power means for moving the rotor toward either of the stator members, and means controlled by the current of the machine whereby movement of the rotor from the desired position between the stator members controls said means to produce movement of the rotor to re-establish it in the desired position between the stator members.

4. In combination, an electric machine embodying a rotor turning between two opposing stator members, power means for moving the rotor toward either of the stator members, and means whereby variation in the air gap on either side of the rotor produces a correcting movement of the rotor to thereby maintain said rotor at a fixed position between the two opposed stator members.

5. In combination, an electric machine embodying a rotor turning between two opposing stator members, power means for moving the rotor toward either of the stator members, and a current controlled means whereby variation in the air gap on either side of the rotor produces a correcting movement of the rotor to thereby maintain said rotor at a fixed position between the two opposed stator members.

6. In combination, an electric machine embodying a rotor turning between two opposing stator members, power means for moving the rotor toward either of the stator members, and means controlled by the current of the machine whereby variation in the air gap on either side of the rotor produces a correcting movement of the stator to thereby maintain said rotor at a fixed position between the two opposed stator members.

7. In combination, a dynamo electric machine embodying a rotary member turning between two stationary armature members, power means for moving the rotary member toward either of the stationary members, and means controlled by the current of said armature members whereby movement of the rotary member from the desired position between the stationary members controls said power means to produce movement of the rotary member to reestablish it in the desired position between the stationary members.

8. In combination, a dynamo electric machine embodying a rotary member turning between two stationary armature members, power means for moving the rotary member toward either of the stationary members, and means controlled by the current in said armature members whereby variation in the air gap on either side of the rotary member produces a correcting movement of said rotary member to thereby maintain said rotary member at a fixed position between the two stationary members.

9. In combination, an electric machine embodying two stator members and a rotor cooperating therewith to generate independent voltages in the two stator members, and mechanism for adjusting the position of the rotor relative to the two stator members, when the machine is in operation, to thereby maintain the voltages in the two stator members substantially equal.

10. In combination, an electric machine embodying two stator members and a rotor cooperating therewith to generate independent voltages in the two stator members, a differential device operated by variations of the voltages generated in the stator members respectively, and means for moving the rotor relative to the stator members, when the machine is in operation, to thereby maintain the voltages in the two stator members substantially equal.

11. In combination, an electric machine embodying two stator members and a rotor cooperating therewith to generate independent voltages in the two stator members, a differential device operated by variations in the voltages generated in the stator members respectively, and means controlled by said differential device for moving the rotor relative to the stator members to thereby maintain substantially uniform voltages in the two stator members.

In testimony whereof, I have hereunto set my hand.

FRED H. KROGER.

Witnesses:
    JOHN L. HOGAN, Jr.,
    FRED'K STAUB.